Sept. 13, 1949.  S. ROBERTSON  2,481,534
TIRE PRESSURE INDICATOR
Filed May 26, 1947  3 Sheets-Sheet 1
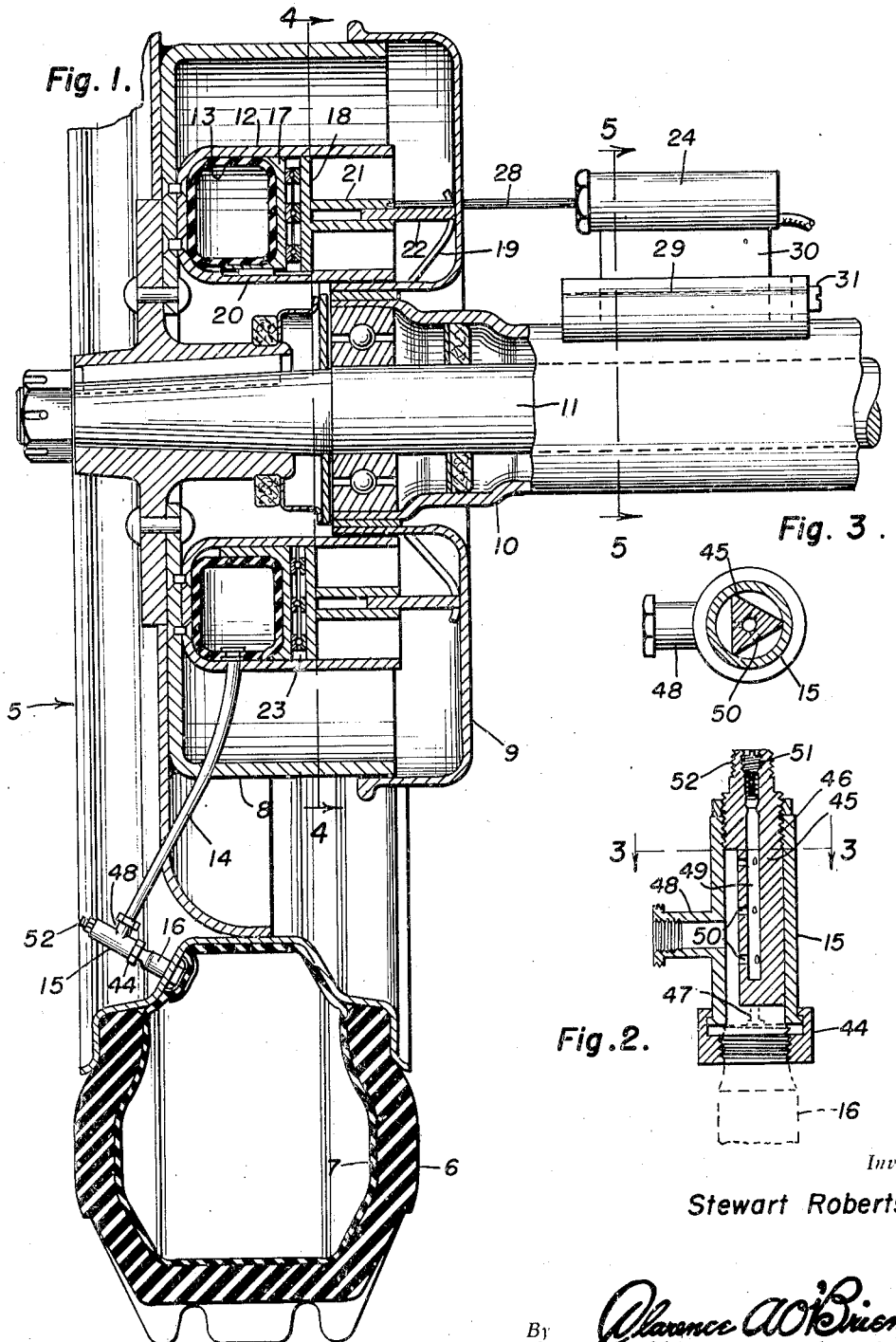
Inventor
Stewart Robertson
By Clarence A. O'Brien
and Harvey B. Jacobson
Attorneys Inventor
Stewart Robertson Sept. 13, 1949.        S. ROBERTSON        2,481,534
TIRE PRESSURE INDICATOR
Filed May 26, 1947        3 Sheets-Sheet 3
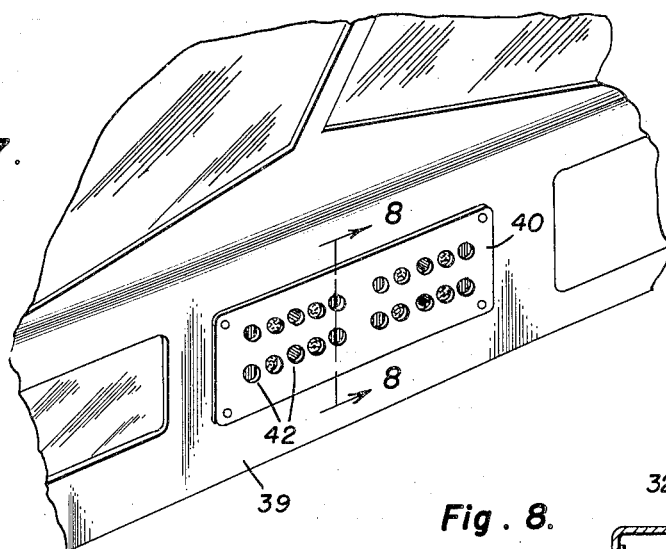
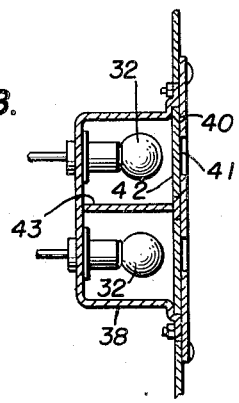
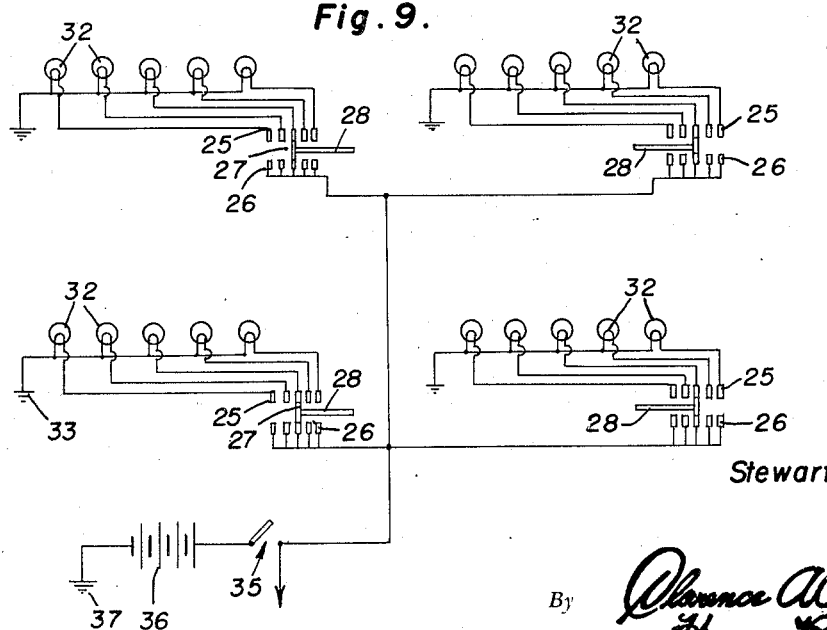
Inventor
Stewart Robertson
By Clarence A. O'Brien
and Harvey B. Jacobson
Attorneys Patented Sept. 13, 1949

2,481,534

UNITED STATES PATENT OFFICE 2,481,534

TIRE PRESSURE INDICATOR

Stewart Robertson, Oakland, Calif., assignor of thirty-three and one-third per cent to David Robertson, Oakland, Ill.

Application May 26, 1947, Serial No. 750,394

2 Claims. (Cl. 200—58)

This invention relates to tire inflation indicators, and the primary object of the invention is to provide a practical device for indicating to the driver of a motor vehicle, while the vehicle is being driven, whether the pressure in each of the pneumatic tires of the vehicle is normal, more or less above or more or less below normal.

Another object is to provide a comparatively simple device of the above kind which may be readily installed on motor vehicles of different makes.

A further object is to provide a device of the above kind including pressure-responsive circuit-controlling means which embodies an annular elastic diaphragm rotatable with and concentric with the axis of each vehicle wheel and connected to the tire of said wheel, a switch including a casing mounted on a stationary part of the vehicle inwardly of the wheel and carrying a series of fixed contacts, and a movable contact co-acting with said fixed contacts and movable transversely of the vehicle, and novel means for moving said movable contact in response to expansion and contraction of said diaphragm.

Other objects and features of the invention will become apparent from the following description when considered in connection with the accompanying drawings, in which:

Figure 1 is a fragmentary vertical transverse section through a wheel having a pneumatic tire and equipped with pressure-responsive circuit-controlling means constructed in accordance with the present invention;

Figure 2 is a central longitudinal sectional view of the fitting for coupling the air tube of the diaphragm with the inflation valve of the inner tube forming part of the pneumatic tire;

Figure 3 is a transverse section taken on line 3—3 of Figure 2;

Figure 7 is a fragmentary perspective view showing the instrument board of the vehicle equipped with indicator lights in accordance with the present invention;

Figure 8 is an enlarged fragmentary vertical section taken on line 8—8 of Figure 7; and Figure 9 is a circuit diagram showing the electrical connections between the various elements of the device.

Figure 4:
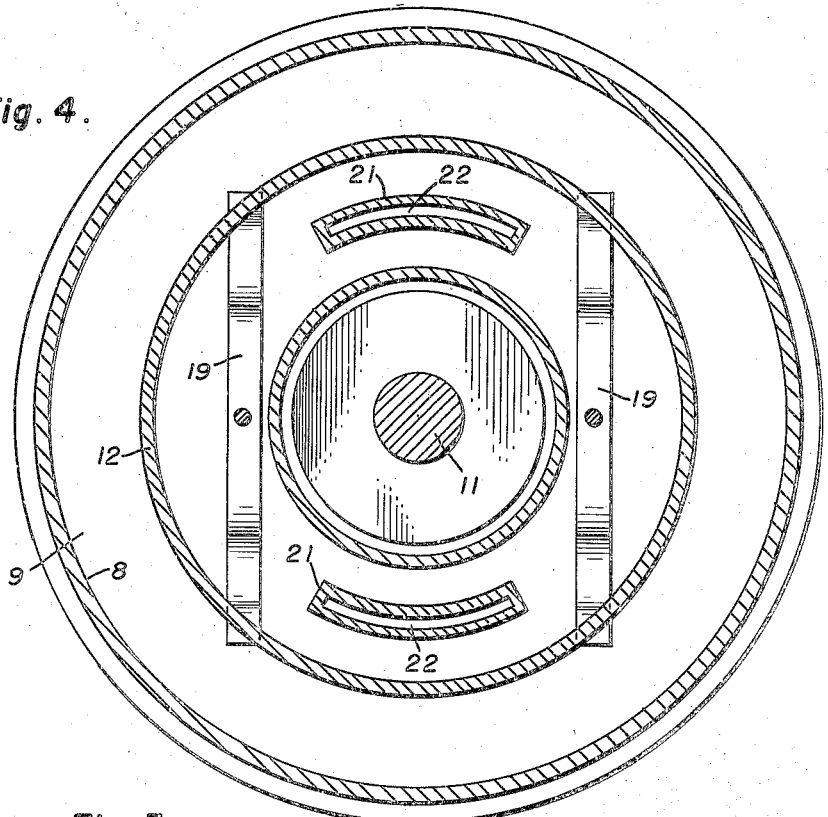
Figure 4 is a fragmentary vertical section taken on line 4—4 of Figure 1.
Figure 5:
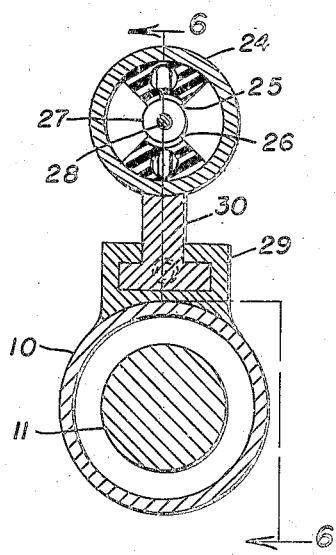
Figure 5 is a vertical section taken on line 5—5 of Figure 1.
Figure 6:
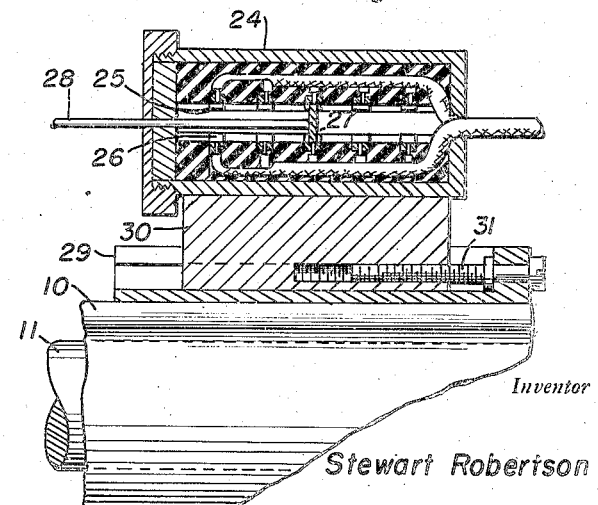
Figure 6 is a vertical section taken on line 6—6 of Figure 5.

Referring in detail to the drawings, 5 indicates a conventional vehicle wheel carrying a pneumatic tire composed of a shoe 6 and an inner tube 7. The wheel also has the usual brake drum 8 secured thereto and rotatable therewith, which brake drum is closed at its inner side by the usual closure disc 9 fixed on a stationary part of the vehicle, such as the housing 10 of the rear axle 11 on which the wheel 5 is mounted.

In accordance with the present invention, pressure-responsive circuit-controlling means is associated with the wheel 5 and includes an annular channel member 12 concentrically mounted within and secured to the drum 8 so as to rotate with the latter. The channel member 12 is open at its inner side, and an annular elastic diaphragm 13 is disposed within and rotatable with said channel member. The diaphragm 13 is connected with the inner tube 7 by means of an air tube 14 and a fitting 15 coupling one end of the air tube 14 with the inflation valve 16 of inner tube 7. Annular presser plates 17 and 18 are slidable in the channel member 12 transversely of the wheel 5, yieldable means, such as leaf springs 19 being provided to move the pressure plates outwardly upon contraction of the diaphragm 13 due to reduction of air pressure within the latter. The presser plate 17 is disposed at the inner side of diaphragm 13 and is keyed at 20 to the channel member 12. The other presser plate 18 is disposed inwardly of the presser plate 17 and is connected to the closure disc 9 so as to be held against rotation thereby. For the latter purpose, the presser plate 18 is provided with inwardly projecting tubular members 21 which are slidably received on outwardly projecting lateral members 22 fixed to the closure disc 9. The springs 19 are preferably centrally riveted to the presser plate 18 and have their ends bearing against closure disc 9. Anti-friction bearing means 23 is provided between the presser plates 17 and 18 so as to freely permit rotation of the presser plate 17 relative to the presser plate 18.

The circuit controlling means further includes a switch embodying a casing 24 and mounted on the stationary part 10 and having therein a longitudinal series of fixed contacts 25 and a second longitudinal series of fixed contracts 26. Each contact 25 is opposed to a contact 26. Movable longitudinally of the casing 24 is a movable contact 27 adapted to bridge one pair of contacts 25 and 26 at a time. This movable bridging contact 27 is carried by a rod 28 slidable through one end of casing 27 and suitably attached to one of the tubular members 21 carried by the presser plate 18. The arrangement is such that when diaphragm 13 is expanded, the contact 27 is moved in one direction, and when diaphragm 13 contracts, said contact 27 is moved in the opposite direction. There are five pairs of contacts 25 and 26 in the casing 24, and the movable contact 27 should bridge the central pair of contacts 25 and 26 when diaphragm 13 is expanded by normal air pressure from tube 7. In order to effect this relationship, the casing 24 is adjustable transversely of the vehicle toward or away from the wheel 5. For this purpose, a guide 29 is fixed on the stationary member 10, and casing 24 has a base 30 slidable in said guide 29 and adjustable with respect to the latter by means of an adjusting screw 31.

Each contact 25 is conected to one side of a different lamp 32, the other side of which is grounded at 33. Also, all of the contacts 26 are connected by a wire 34 to one contact of the usual ignition switch 35 so that current is only supplied to the contacts 26 when the ignition switch 35 is closed. The other side of the source 36 is grounded at 37. It is to be understood that there is one pressure-responsive circuit-controlling switch, as above described, for each wheel of the vehicle, and the contacts 26 of each such switch are connected to the wire 34 as shown in Figure 9. Also, the contacts 25 of each such switch are connected to additional different lamps 32 as above described so that there is one set of lamps controlled by each pressure-responsive switch. All of the lamps 32 are preferably arranged within a single lamp box 38 mounted in an opening of the instrument board 39 of the vehicle. This lamp box includes a face plate 40 having a plurality of apertures 41 which are so arranged that one is provided for each lamp 32. Glass covers 42 are provided for apertures 21, that for the central lamp of each set being preferably of a green color, those for the end lamps of each set preferably being of a red color, and those for the lamps between the central and end lamps preferably being of an orange color or the like as indicated by the shading in Figure 7. The lamp box 38 is preferably partitioned as indicated at 43 in Figure 8 so as to provide four compartments, with one set of lamps in each compartment. By suitably labeling the different sets of colored plates 42, the particular wheel for which each set of lights is provided will be known to the driver.

In operation, when the pressure in the tube 7 is normal, the diaphragm 13 will be expanded to a condition wherein the contact 27 bridges the central contacts 25 and 26 and closes the circuit of the central lamp 32 of the associated set. This displays a green light so as to indicate to the driver that the pressure in the associated tire is normal. Should the pressure in the tire drop slightly below normal, the contact 27 will be moved so as to close the circuit of the lamp 32 at one side of that which shows the green light, thereby showing an orange light at the proper side to show below-normal pressure. Should the pressure go considerably below normal, the proper end lamp will be lighted to show a red light, thereby indicating that the pressure is considerably below normal and that the tire pressure should be increased. On the other hand, should the pressure rise slightly above normal for any reason the orange light at the opposite side of the green light will be lighted to indicate that fact, whereas abnormal high pressure will be shown by the lighting of lamp 32 at the latter side of the green light which shows a red light, thereby indicating that the pressure is considerably above normal and should be reduced.

As shown in Figures 2 and 3, the fitting 15 has a swiveled nut 44 adapted to thread on the valve stem 16 of tube 7. A triangular plug 45 is threaded at 46 into the casing of fittings 15 and is adapted, when screwed inwardly, to engage the stem 47 of the valve core in the valve stem 16 so as to unseat the valve member of said stem 16 and thereby allow the pressure within tube 7 to flow to diaphragm 13. The air tube 14 is connected to a branch nipple 48 of the fitting 15. Plug 45 has an axial bore 49, and is provided with a plurality of ports 50 which extend through the sides of plug 45 from the bore 49. The usual inflation valve 51 is provided in the outer end of the bore 49 of plug 45, and the arrangement is such that an inflation hose may be coupled to the threaded outer end 52 of plug 45 for inflating the tube 7 without disconnecting the fitting 15 from the inflation valve stem 16 of the inner tube. At the same time, by rotating nut 44, fitting 15 may be readily uncoupled from the inflation valve stem 16 of tube 7 when it becomes necessary to remove the tire of the wheel 5 for repair.

From the foregoing description, it will be seen that I have provided a simple and highly efficient device for indicating the various stages of pressure in a tire, said device being adaptable for installation upon automobiles of various makes. Minor changes in details of construction are contemplated, such as fall within the scope of the invention as claimed.

What is claimed is:

1. In a tire inflation indicator for a motor vehicle having wheels equipped with pneumatic tires, and wherein a brake drum is carried by and rotatable with each wheel, and a stationary closure disc for the brake drum is carried by a stationary member of the vehicle, pressure-responsive circuit-controlling means including an annular-channel member concentrically mounted within and rotatable with the brake drum, an annular elastic diaphragm disposed within and rotatable with said channel member and connected with the tire, annular presser plates slidable in the channel member transversely of the wheel, yieldable means to move the presser plates outwardly upon contraction of said diaphragm, one of said presser plates being disposed at the inner side of said diaphragm and keyed to the channel member, the other pressure plate being disposed inwardly of said one presser plate and slidably connected to said closure disc so as to be held against rotation thereby and to be movable transversely of the wheel relative thereto, anti-friction bearing means between said presser plates, and a multiple signal-circuit controlling switch including a casing mounted on said stationary member of the vehicle and carrying a series of pairs of fixed contacts and a movable contact movable for successively co-acting with said pairs of fixed contacts and mechanically connected to said other presser plate for movement thereby.

2. The construction defined in claim 1, in combination with means for adjusting said switch casing transversely of the vehicle toward or from said wheel for effecting predetermined relationship between said movable contact and a certain pair of said fixed contacts when the pressure in the tire is normal.

STEWART ROBERTSON.

REFERENCES CITED

The following references are of record in the file of this patent:

UNITED STATES PATENTS

| Number | Name | Date |
|---|---|---|
| 1,849,139 | Denmire | Mar. 15, 1932 |
| 2,071,256 | Dobbs | Feb. 16, 1937 |
| 2,119,287 | Pratt | May 31, 1938 |

FOREIGN PATENTS

| Number | Country | Date |
|---|---|---|
| 1,331 | Great Britain | Jan. 18, 1911 |